US009812694B2

(12) United States Patent
Takano et al.

(10) Patent No.: US 9,812,694 B2
(45) Date of Patent: Nov. 7, 2017

(54) ELECTRODE MEMBER AND BATTERY BLOCK

(71) Applicant: SANYO Electric Co., Ltd., Osaka (JP)

(72) Inventors: Akira Takano, Osaka (JP); Takashi Nakagawa, Osaka (JP); Masahiro Ono, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 110 days.

(21) Appl. No.: 14/762,803

(22) PCT Filed: Jan. 28, 2014

(86) PCT No.: PCT/JP2014/000416
§ 371 (c)(1),
(2) Date: Jul. 22, 2015

(87) PCT Pub. No.: WO2014/119286
PCT Pub. Date: Aug. 7, 2014

(65) Prior Publication Data
US 2015/0364744 A1 Dec. 17, 2015

(30) Foreign Application Priority Data

Jan. 29, 2013 (JP) .................................. 2013-014734

(51) Int. Cl.
*H01M 2/34* (2006.01)
*H01M 2/20* (2006.01)
(Continued)

(52) U.S. Cl.
CPC ............. *H01M 2/34* (2013.01); *H01M 2/202* (2013.01); *H01M 2/1016* (2013.01);
(Continued)

(58) Field of Classification Search
CPC ............................ H01M 2/34; H01M 10/0525
See application file for complete search history.

(56) References Cited

U.S. PATENT DOCUMENTS

| 2001/0002812 A1 | 6/2001 | Sumida et al. |
| 2001/0012731 A1 | 8/2001 | Sumida et al. |

(Continued)

FOREIGN PATENT DOCUMENTS

| JP | 2001-160347 | 6/2001 |
| JP | 2002-056839 | 2/2002 |

(Continued)

OTHER PUBLICATIONS

WO2012164884 Jun. 2012, Nakagawa T et al.*
International Search Report of PCT application No. PCT/JP2014/000416 dated Mar. 4, 2014.

*Primary Examiner* — Stewart Fraser
*Assistant Examiner* — Rachel L Zhang
(74) *Attorney, Agent, or Firm* — McDermott Will & Emery LLP

(57) ABSTRACT

Collector connected to a terminal of a cell includes: substrate portion made of a conductive plate material; connection portion that is defined by first slit formed in the conductive plate material, and is connected to the terminal of the cell; narrow fuse that is defined by second slits that are formed in the conductive plate material so as to extend from first slit, and whose one end is connected to substrate portion and the other end is connected to connection portion; and insulating film bonded to a region including fuse and second slits defining fuse across substrate portion and connection portion.

9 Claims, 7 Drawing Sheets

(51) Int. Cl.
*H01M 2/10* (2006.01)
*H01M 10/0525* (2010.01)

(52) U.S. Cl.
CPC .... *H01M 10/0525* (2013.01); *H01M 2200/00* (2013.01); *H01M 2200/103* (2013.01)

(56) References Cited

U.S. PATENT DOCUMENTS

| | | |
|---|---|---|
| 2002/0058441 A1 | 5/2002 | Sumida et al. |
| 2003/0075352 A1 | 4/2003 | Sumida et al. |
| 2007/0099073 A1* | 5/2007 | White ................ H01M 2/1055 429/158 |
| 2011/0177365 A1 | 7/2011 | Yasui et al. |
| 2012/0308877 A1* | 12/2012 | Hirai .................... H01M 2/024 429/184 |
| 2013/0202941 A1 | 8/2013 | Ono et al. |

FOREIGN PATENT DOCUMENTS

| | | |
|---|---|---|
| JP | 2013-030393 | 2/2013 |
| JP | 2013-134828 | 7/2013 |
| WO | 2011/007535 | 1/2011 |
| WO | 2012/164884 | 12/2012 |

\* cited by examiner

ELECTRODE MEMBER AND BATTERY BLOCK

CROSS-REFERENCE TO RELATED APPLICATIONS

This application is a U.S. national stage application of the PCT International Application No. PCT/JP2014/000416 filed on Jan. 28, 2014, which claims the benefit of foreign priority of Japanese patent application 2013-014734 filed on Jan. 29, 2013, the contents all of which are incorporated herein by reference.

TECHNICAL FIELD

The present invention relates to an electrode member connected to a terminal of a cell, and a battery block formed by interconnecting a plurality of cells in parallel.

BACKGROUND ART

A fuse is sometimes disposed in a current path connected to a terminal of a cell. This fuse has a function of electrically disconnecting the cell by melting caused by heat generation when the current flowing out of the cell becomes excessive.

For example, Patent Literature 1 discloses a manufacturing method of a fuse. In this manufacturing method, a terminal on the input side and a plurality of terminals on the output side are formed by press-punching a conductive metal plate. Then, on the conductive metal plate, a region including a portion where a fuse element is to be formed later is previously molded with an insulating material. In this state, the fuse element is processed and formed in the element formed portion.

CITATION LIST

Patent Literature

PTL 1: Unexamined Japanese Patent Publication No. 2001-160347

SUMMARY OF THE INVENTION

The purpose of the present invention is to provide a structure where, when a narrow fuse is included in an electrode member connected to a terminal of a cell, the fuse is hardly broken or damaged during the connecting work to the cell or the like.

The electrode member of the present invention is an electrode member connected to a terminal of a cell. The electrode member includes the following components:
 a substrate portion made of a conductive plate material;
 a connection portion that is defined by a first slit formed in the conductive plate material, and is connected to the terminal of the cell;
 a narrow fuse that is defined by a second slit that is formed in the conductive plate material so as to extend from the first slit, and whose one end is connected to the substrate portion and the other end is connected to the connection portion; and
 an insulating film bonded to a region that includes the fuse and the second slit defining the fuse across the substrate portion and the connection portion.

A battery block of another aspect of the present invention is a battery block formed by interconnecting a plurality of cells in parallel. The battery block includes the following components:
 the plurality of cells;
 a positive-side collection portion for interconnecting a plurality of positive terminals to collect power; and
 a negative-side collection portion for interconnecting a plurality of negative terminals to collect power.

The positive-side collection portion or negative-side collection portion includes a collector integrally formed of the electrode members each of which has the above-mentioned structure and corresponds to each cell.

DESCRIPTION OF EMBODIMENT(S)

One example (hereinafter referred to as "exemplary embodiment") of the exemplary embodiment of the present invention is described hereinafter in detail with reference to the accompanying drawings. In this description, specific shape, material, numerical value, and direction are examples for allowing the present invention to be easily understood, and can be appropriately changed in accordance with the application, purpose, or specification. When a plurality of exemplary embodiments or modified examples are included in the following description, use of an appropriate combination of their feature parts is assumed from the beginning.

Figure 1:
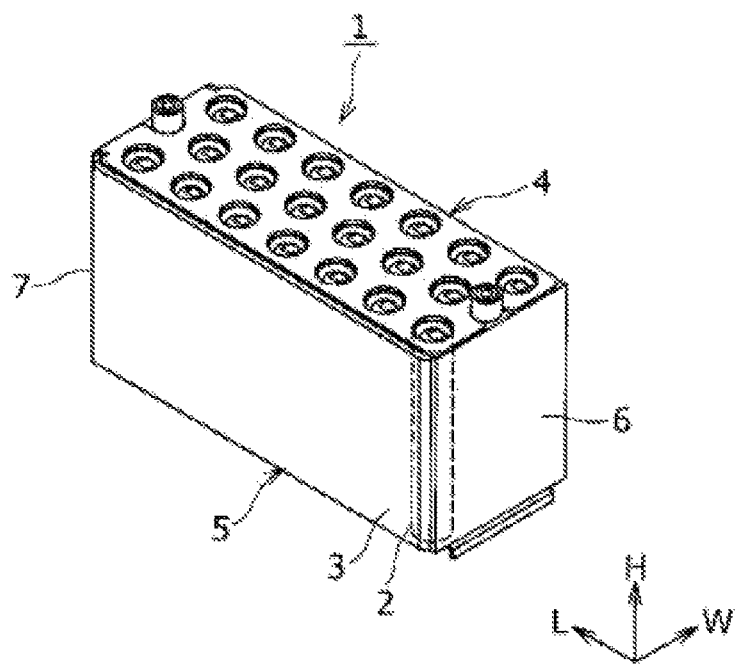
FIG. 1 is a perspective view showing a battery block as an example of an exemplary embodiment of the present invention.
Figure 2:
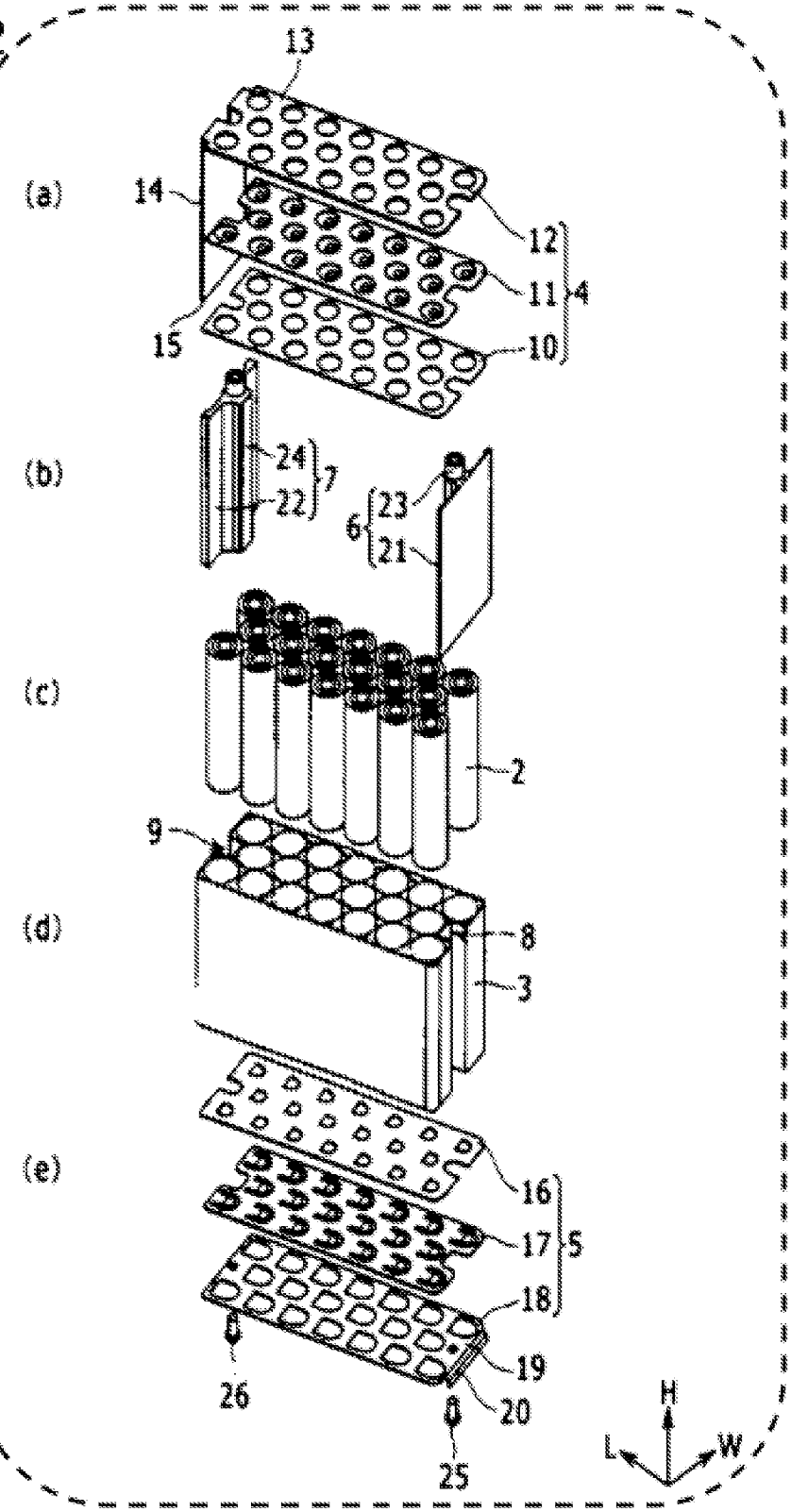
FIG. 2 is an exploded perspective view of the battery block of FIG. 1.
Figure 3:
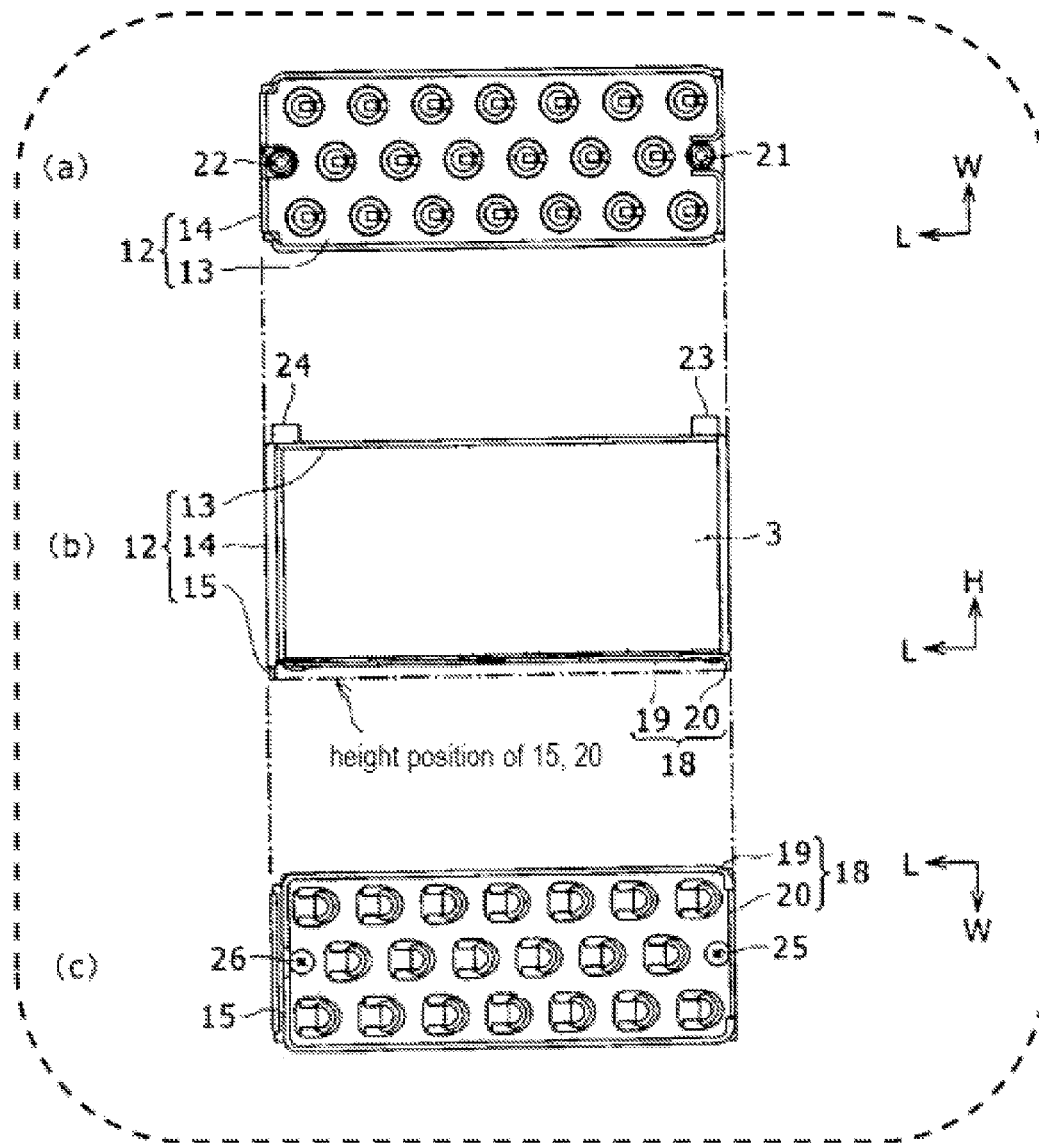
FIG. 3 is a top view, front view, and bottom view of the battery block of FIG. 1.

FIG. 1 is a perspective view showing battery block 1. FIG. 2 is an exploded view of battery block 1. FIG. 3 is a trihedral diagram of battery block 1. FIG. 3 (a) is a top view, FIG. 3 (b) is a front view, and FIG. 3 (c) is a bottom view. In battery block 1, a predetermined capacity is obtained by interconnecting a plurality of cells 2 in parallel. In this case, 20 cells 2 are used. Battery block 1 is obtained by the following processes of
 arranging 20 cells 2 in a predetermined arrangement relation by aligning the positive electrodes of cells 2 on one side and aligning the negative electrodes thereof on the other side;
 storing and holding cells 2 in case 3;
 disposing positive-side collection portion 4 on the positive side;
 disposing negative-side collection portion 5 on the negative side; and fastening positive-side collection portion 4 and negative-side collection portion 5 via holders 6 and 7 using appropriate fastening members 25 and 26.

In FIG. 1, height direction H, length direction L, and width direction W are shown as three mutually orthogonal axes. Height direction H shows the longitudinal direction of cells 2. Length direction L and width direction W show arrangement directions of two-dimensional arrangement of cells 2. The direction along the longer side is set as length direction L, and the direction along the shorter side is set as width direction W. The same is true of the following diagrams.

Each cell 2 is a chargeable/dischargeable secondary cell. As the secondary cell, a lithium-ion cell is used. Furthermore, a nickel-metal-hydride cell or an alkaline cell may be used. FIG. 2 (c) shows a perspective view of 20 cells 2 in the state where they are stored and arranged in battery block 1. As shown here, 20 cells 2 are arranged in a staggered format that minimizes the clearances between adjacent cells. Three rows of cells are arranged in width direction W, and seven cells, six cells, and seven cells are arranged along length direction L in respective rows.

Each cell 2 has a cylindrical outer shape. One of both ends of the cylindrical shape is used as a positive terminal, and the other is used as a negative terminal. In the present exemplary embodiment, a positive terminal is disposed at the upper end of each cell 2 shown in FIG. 2, and a negative terminal is disposed at the lower end. An example of each cell 2 is a lithium-ion cell in which the diameter is 18 mm, the height is 65 mm, the voltage between the terminals is 3.6 V, and the capacity is 2.5 Ah. These values are examples for description, and other dimensions and characteristic values may be used. Each cell 2 is not limited to a cylindrical cell, and may be a cell having another outer shape.

Case 3 is a holding vessel for holding 20 cells 2 in a state where they are aligned and arranged in a predetermined arrangement relation. FIG. 2 (d) shows a perspective view of case 3. Case 3 is a frame body that has the same height as that of cells 2, and includes 20 cell storage portions. Both ends of each cell storage portion in height direction H are open. Each cell 2 is stored and disposed in each cell storage portion.

The cell storage portions are arranged in a staggered format in association with the arrangement relation of cells 2 shown in FIG. 2 (c). In other words, three rows of cell storage portions are arranged in width direction W, and seven cell storage portions, six cell storage portions, and seven cell storage portions are arranged along length direction L in respective cell storage portion rows. Therefore, the length of the middle cell-storage-portion row along length direction L is shorter than those of cell-storage-portion rows on both sides along height direction H. Thus, grooves 8 and 9 as margin spaces having no cell 2 are formed in middle parts along width direction W at both ends of case 3 along height direction H.

As case 3, a case that is mainly made of aluminum and has a predetermined shape formed by extrusion molding can be employed.

When 20 cells 2 are stored and arranged in the cell storage portions in case 3, the positive electrodes of cells 2 are aligned on one side, and the negative electrodes thereof are aligned on the other side. In FIG. 1, the one side corresponds to the upside of the page along height direction H, and the other side corresponds to the downside of the page along height direction H.

Positive-side collection portion 4 is a connection member that is disposed so as to block the opening on the one side of case 3 and electrically interconnects the positive electrodes of aligned cells 2. FIG. 2 (a) shows positive-side collection portion 4. As shown here, positive-side collection portion 4 includes positive-side insulating plate 10, positive electrode collector 11, and positive electrode plate 12. Each of positive-side insulating plate 10, positive electrode collector 11, and positive electrode plate 12 includes notches corresponding to grooves 8 and 9 described for case 3.

Positive-side insulating plate 10 is a plate material that is disposed between case 3, and positive electrode collector 11 and positive electrode plate 12 and electrically insulates case 3 from them. Positive-side insulating plate 10 includes 20 openings through which the positive electrodes of cells 2 are projected. Positive-side insulating plate 10 is formed by processing, in a predetermined shape, a plastic molded article or plastic sheet having a predetermined heat resistance and electrical insulating property.

Positive electrode collector 11 is a thin plate including 20 electrode contact portions. The electrode contact portions are arranged in a positional relation in which each electrode contact portion elastically comes into contact with the positive electrode of each cell 2. In positive electrode collector 11, the electrode contact portions having a predetermined shape may be formed by etching or pressing a metal thin plate having electric conductivity.

Positive electrode plate 12 is an electrode plate that is electrically connected to positive electrode collector 11 and is used for forming one positive-side output terminal by interconnecting 20 electrode contact portions. Positive electrode plate 12 is a folded plate, and includes plane portion 13 facing positive electrode collector 11, and side surface portion 14 that is folded from an end of plane portion 13 in length direction L toward negative-side collection portion 5 along height direction H.

The folding of positive electrode plate 12 from plane portion 13 to side surface portion 14 is performed at the end in length direction L and on the holder 7 side, namely on the left side on the page of FIG. 2. Plane portion 13 includes 20 openings so that each electrode contact portion of positive electrode collector 11 can be deformed elastically. The length of side surface portion 14 along height direction H is set so that the position of tip 15 along height direction H corresponds to the arrangement position of negative-side collection portion 5 when battery block 1 is assembled.

As positive electrode plate 12, a metal thin plate having an electric conductivity and an appropriate thickness and strength can be employed. In positive electrode plate 12, the electrode contact portions having a predetermined shape may be formed in plane portion 13 by etching or pressing it, and side surface portion 14 may be folded perpendicularly to plane portion 13 by bending work.

Negative-side collection portion 5 is a connection member that is disposed on the opening on the other side of case 3 and electrically interconnects the negative electrodes of aligned cells 2. FIG. 2 (e) shows negative-side collection portion 5. As shown here, negative-side collection portion 5 includes negative-side insulating plate 16, negative electrode collector 17, and negative electrode plate 18. Each of negative-side insulating plate 16 and negative electrode collector 17 includes notches corresponding to grooves 8 and 9 described for case 3. Negative electrode plate 18 includes screw holes for fastening members 25 and 26 at the places corresponding to grooves 8 and 9.

Negative-side insulating plate 16 is a plate material that is disposed between case 3, and negative electrode collector 17 and negative electrode plate 18 and electrically insulates case 3 from them. Negative-side insulating plate 16 includes 20 openings through which the negative electrodes of cells 2 are exposed. Negative-side insulating plate 16 is formed by processing, in a predetermined shape, a plastic molded article or plastic sheet having a predetermined heat resistance and electrical insulating property.

Negative electrode collector 17 is an electrode member including 20 electrode contact portions. The electrode contact portions are arranged in a positional relation in which each electrode contact portion comes into contact with the negative electrode of each cell 2. In negative electrode collector 17, the electrode contact portions having a predetermined shape may be formed by etching or pressing a metal thin plate having electric conductivity. The electrode contact portions formed in negative electrode collector 17 are described later in detail.

Negative electrode plate 18 is an electrode plate that is electrically connected to negative electrode collector 17 and is used for forming one negative-side output terminal by interconnecting 20 electrode contact portions. Negative electrode plate 18 includes plane portion 19, and tip 20 folded from an end in length direction L of plane portion 19 toward the downside on the page of FIG. 2 along height direction H. The folding from plane portion 19 to tip 20 is performed at the end in length direction L and on the holder 6 side, namely on the right side on the page of FIG. 2. In other words, the folding of negative electrode plate 18 and the folding of positive electrode plate 12 are performed at the opposite ends along length direction L of battery block 1.

The amount of folding from plane portion 19 to tip 20 is set so that, when battery block 1 is assembled, the position of tip 20 along height direction H is the same as the position of tip 15 of side surface portion 14 of positive electrode plate 12 along height direction H. FIG. 3 (b) shows that the position of tip 20 along height direction H is the same as that of tip 15 along height direction H.

As negative electrode plate 18, a metal thin plate having an electric conductivity and an appropriate thickness and strength can be employed. In negative electrode plate 18, the electrode contact portions having a predetermined shape are formed by etching or pressing the metal thin plate, and tip 20 is folded perpendicularly to plane portion 19 by bending work.

Holders 6 and 7 are members for fastening, using fastening members, positive-side collection portion 4 disposed on one side of case 3 and negative-side collection portion 5 disposed on the other side, thereby integrating case 3, positive-side collection portion 4, and negative-side collection portion 5. Holders 6 and 7 are made of an insulating material. FIG. 2 (b) shows holders 6 and 7. In this structure, at both ends of case 3 in length direction L, holder 6 is disposed on the right of the page, and holder 7 is disposed on the left. Holders 6 and 7 do not need to be formed separately. For example, the side portion covering a side surface of case 3 may be integrated with the upper portion covering the positive electrodes, or the side portion covering the side surface of case 3 may be integrated with the lower portion covering the negative electrodes.

As shown in FIG. 2 (b), holders 6 and 7 are disposed so as to abut on opposite surfaces of the outer shape of case 3, respectively. Holders 6 and 7 include wall portions 21 and 22 abutting on side surfaces of case 3, and shafts 23 and 24 fitted into grooves 8 and 9 of case 3, respectively. The end of each of shafts 23 and 24 includes a screw hole for each fastening member. Holders 6 and 7 can be formed by processing an insulating plate material in a predetermined shape.

Fastening members 25 and 26 are screws for fixing negative-side collection portion 5 to holders 6 and 7 using female screw portions disposed in shafts 23 and 24 of holders 6 and 7, respectively. Similarly, positive-side collection portion 4 is fixed to holders 6 and 7 using other fastening members (not shown).

Thus, in battery block 1, cells 2 are stored in the case having 20 cell storage portions. At this time, the positive electrodes of cells 2 are aligned on one side, the negative electrodes thereof are aligned on the other side, positive-side collection portion 4 is disposed on the positive side, negative-side collection portion 5 is disposed on the negative side, and they are integrated via holders 6 and 7 using appropriate fastening members 25 and 26.

The cell storage portions serving as aligning guide holes are used for arranging cells 2, so that the positional accuracy of cells 2 is improved, and the positioning accuracy between the positive electrodes of cells 2 and positive-side collection portion 4 and the positioning accuracy between the negative electrodes and negative-side collection portion 5 can be increased. The outer shape of battery block 1 is defined by case 3 and holders 6 and 7 abutting on case 3 regardless of the arrangement of cells 2, so that the dimensional accuracy of the outer shape of battery block 1 is improved.

Tip 15 of positive electrode plate 12 and tip 20 of negative electrode plate 18 are disposed in battery block 1, and the height positions of them are the same, so that wires are easily pulled out. Therefore, battery block 1 can be formed by combining and integrating a plurality of cells 2 at a high accuracy and high workability.

In the above description, one battery block 1 is formed by interconnecting 20 cells 2 in parallel. Thus, battery block 1 having an inter-terminal voltage of 3.6 V and a capacity of $(2.5 \text{ Ah} \times 20) = 50$ Ah can be obtained. When an increased amount of capacity is required, a plurality of battery blocks 1 can be interconnected in parallel. Alternatively, a case having an increased number of cell storage portions, and a positive-side collection portion and negative-side collection portion having an increased number of electrode contact portions may be used. Also in these structures, a plurality of cells 2 can be combined and integrated at a high accuracy and high workability.

A battery module may be formed by preparing and arranging a plurality of battery blocks 1 side by side and interconnecting them in series. In this structure, in the place where adjacent battery blocks 1 face each other, tip 15 of positive electrode plate 12 in one-side battery block 1 is electrically and mechanically connected to tip 20 of negative electrode plate 18 in the-other-side battery block 1 by a connecting/fixing method such as welding. This connection is performed at the position where tip 15 of side surface portion 14 of positive electrode plate 12 in one-side battery block 1 comes into contact with tip 20 of negative electrode plate 18 in the-other-side battery block 1. By repeating this process between adjacent battery blocks 1, the plurality of battery blocks 1 can be interconnected in series.

Figure 4:
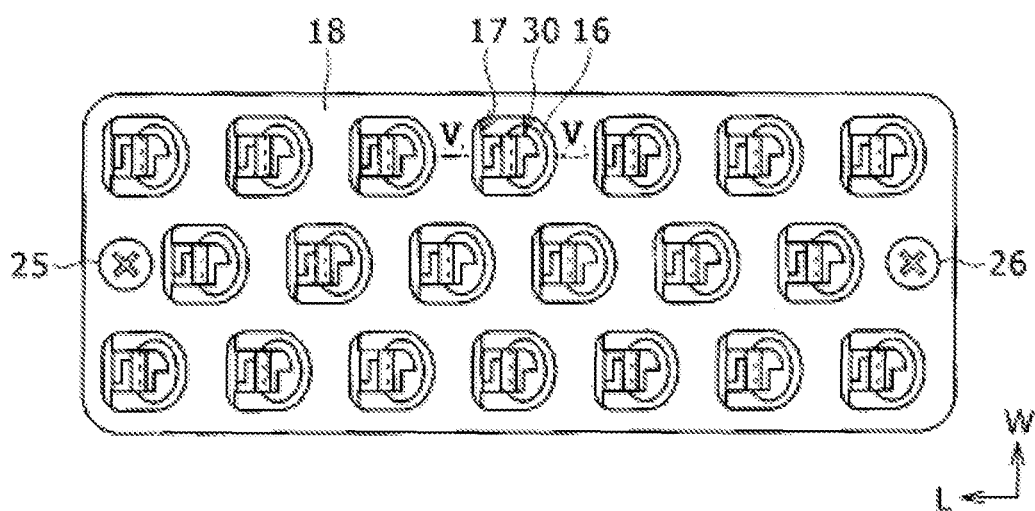
FIG. 4 is a diagram showing an enlarged bottom view of FIG. 3.
Figure 5:
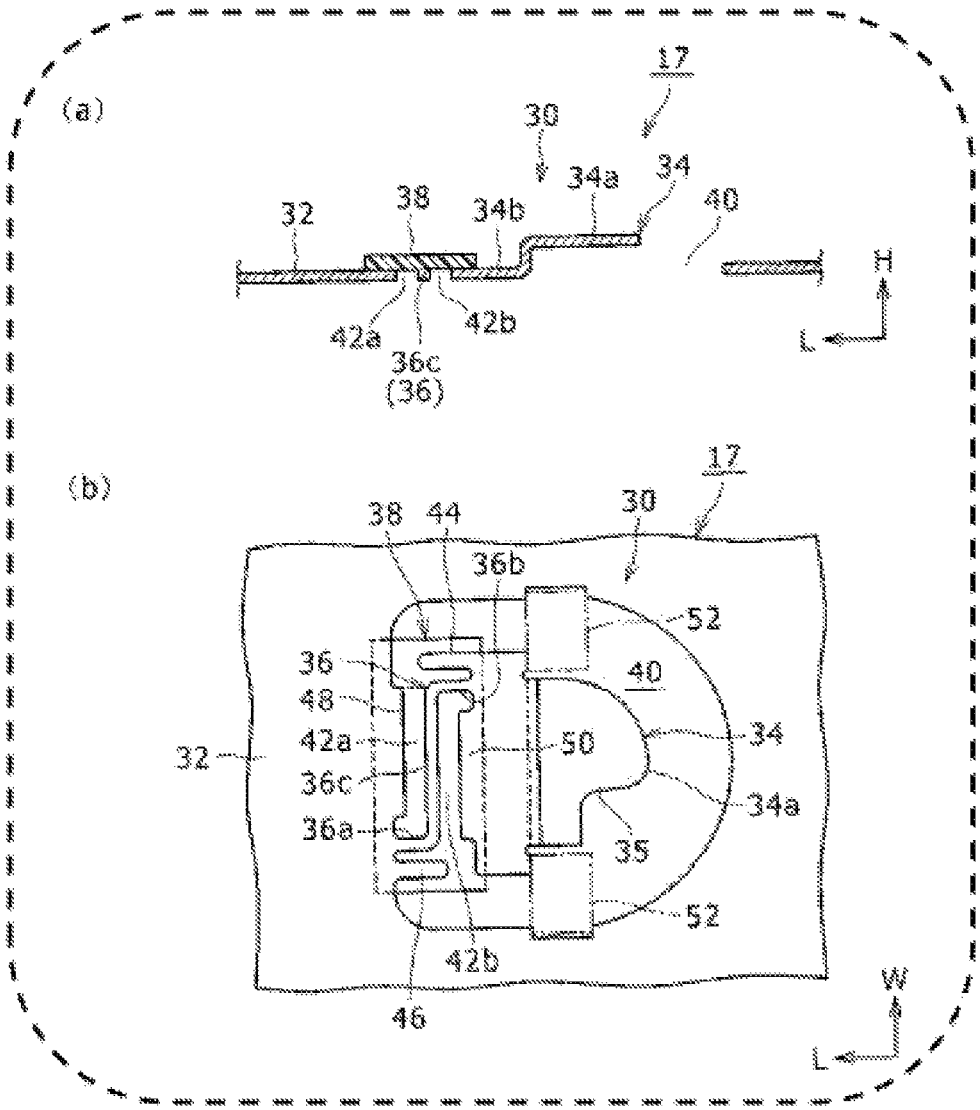
FIG. 5(a) is a diagram showing an enlarged negative electrode collector taken along line V-V of FIG. 4.
FIG. 5(b) is a bottom view of the enlarged negative electrode collector.

The electrode contact portions of negative electrode collector 17 are described with reference to FIG. 4 to FIG. 8. FIG. 4 is a diagram showing an enlarged bottom view of FIG. 3. FIG. 5(a) is a diagram showing enlarged each electrode contact portion 30 of negative electrode collector 17 taken along line V-V of FIG. 4. FIG. 5(b) is a bottom view of electrode contact portion 30.

As shown in FIG. 4, when battery block 1 is assembled, electrode contact portions 30 of negative electrode collector 17 are exposed to the outside through openings in negative electrode plate 18. Each electrode contact portion 30 of the negative electrode collector is in contact with the surface of the negative terminal of each cell 2 through each opening in negative-side insulating plate 16.

As discussed above, in negative electrode collector 17, electrode contact portions 30 having a predetermined shape are formed correspondingly to cells 2 by etching or pressing a metal thin plate having electric conductivity, for example. Each electrode contact portion 30 includes: substrate portion 32 made of a conductive metal thin plate; connection portion 34 connected to the surface of the negative terminal of each cell 2; fuse 36 for electrically and mechanically connecting between substrate portion 32 and connection portion 34; and insulating film 38 bonded to a region including fuse 36. Electrode contact portion 30 corresponds to the electrode member of the present invention, and negative electrode collector 17 corresponds to a product formed by integrating a plurality (20 in the present exemplary embodiment) of electrode contact portions 30 disposed in association with respective cells 2.

The periphery or outer shape of connection portion 34 is defined by substantially U-shaped first slit 40 formed by press-punching a metal thin plate. Connection portion 34 includes substantially semicircular tip 34a, and base end 34b extending from tip 34a in length direction L. Tip 34a of connection portion 34 includes substantially fan-shaped cut-away portion 35, for example. Cut-away portion 35 is used to expose a part of the surface of a negative terminal when connection portion 34 is bonded to the surface of the negative terminal of cell 2 by welding or the like. Preferably, the remaining part other than cut-away portion 35 in tip 34a of connection portion 34 is disposed in a place near the connection point between fuse 36 and base end 34b of connection portion 34. In other words, it is preferable that cut-away portion 35 is disposed in a place far from the connection point between fuse 36 and base end 34b of connection portion 34. That is because wiring resistance increases as the distance increases which is from the connection point between the fuse 36 and base end 34b of connection portion 34 to tip 34a connected to the surface of the negative terminal.

As shown in FIG. 5 (a), tip 34a of connection portion 34 is temporarily bent upward in height direction H and bent along length direction L. Due to such bending, when battery block 1 is assembled from negative electrode collector 17, connection portion 34 of electrode contact portion 30 comes into contact with the negative terminal of cell 2 through the opening formed in negative-side insulating plate 16.

Base end 34b of connection portion 34 has a substantially rectangular shape. Base end 34b is electrically and mechanically connected to substrate portion 32 via fuse 36.

Fuse 36 has a function of electrically disconnecting cell 2, by melting caused by heat generation, when the current value flowing into or out of the negative terminal of cell 2 exceeds a predetermined threshold. In order to cause such melting, fuse 36 is extended with a constant narrow width so as to have a substantially S shape.

The periphery or outer shape of fuse 36 is defined by two second slits 42a and 42b formed by press-punching the metal thin plate so that second slits extend from first slit 40. In more detail, two second slits 42a and 42b have a predetermined depth value, and are extended from two ends of substantially U-shaped first slit 40 in the opposite directions along width direction W. Thus, fuse 36 remains between two second slits 42a and 42b.

Fuse 36 includes: first fuse portion 36a extending from the edge of substrate portion 32 toward connection portion 34; second fuse portion 36b extending from the edge of base end 34b of connection portion 34 toward substrate portion 32; and third fuse portion 36c linearly disposed between the ends of first fuse portion 36a and second fuse portion 36b so as to be connected to the ends.

Furthermore, substrate portion 32 includes first projection (overhang) 46 projecting closely to and substantially in parallel with first fuse portion 36a, and connection portion 34 includes second projection (overhang) 44 projecting closely to and substantially in parallel with second fuse portion 36b. By increasing the bonding area of first and second projections 46 and 44 to insulating film 38, the bonding strength of insulating film 38 can be increased. By forming first and second projections 46 and 44 in parallel with each other at positions close to fuse 36, the effect of reinforcing first and second fuse portions 36a and 36b of fuse 36 with insulating film 38 can be improved.

Insulating film 38 is formed of a rectangular resin film, for example. Insulating film 38 is bonded to a region including fuse 36 and second slits 42a and 42b defining fuse 36 across substrate portion 32 and connection portion 34. Insulating film 38 has an electric conductivity and an appropriate thickness and rigidity, and has a function of reinforcing fuse 36 when insulating film 38 is bonded to the region including fuse 36. As insulating film 38, a film in which a thermosetting resin having flame retardancy is stacked on a polyimide film is suitably used, for example. Fuse 36 is fixed to insulating film 38 by thermal welding by the thermosetting resin. When the thermoplastic resin is used as insulating film 38, peel off of fuse 36 from insulating film 38 is sometimes caused by the heat generation of such a degree that fuse 36 is not disconnected. However, the present invention is not limited to this, and insulating film 38 may be bonded using an adhesive or the like.

The edge of substrate portion 32 that faces second slit 42a includes substantially trapezoidal overhang 48. The edge of base end 34b of connection portion 34 that faces second slit 42b includes substantially trapezoidal overhang 50. Similarly to first and second projections 46 and 44, overhangs 48 and 50 increase the bonding strength by enlarging the bonding area to insulating film 38. Overhangs 48 and 50 are formed in parallel on both sides of third fuse portion 36c of fuse 36, so that the effect of reinforcing third fuse portion 36c of fuse 36 by insulating film 38 can be improved.

Figure 6:
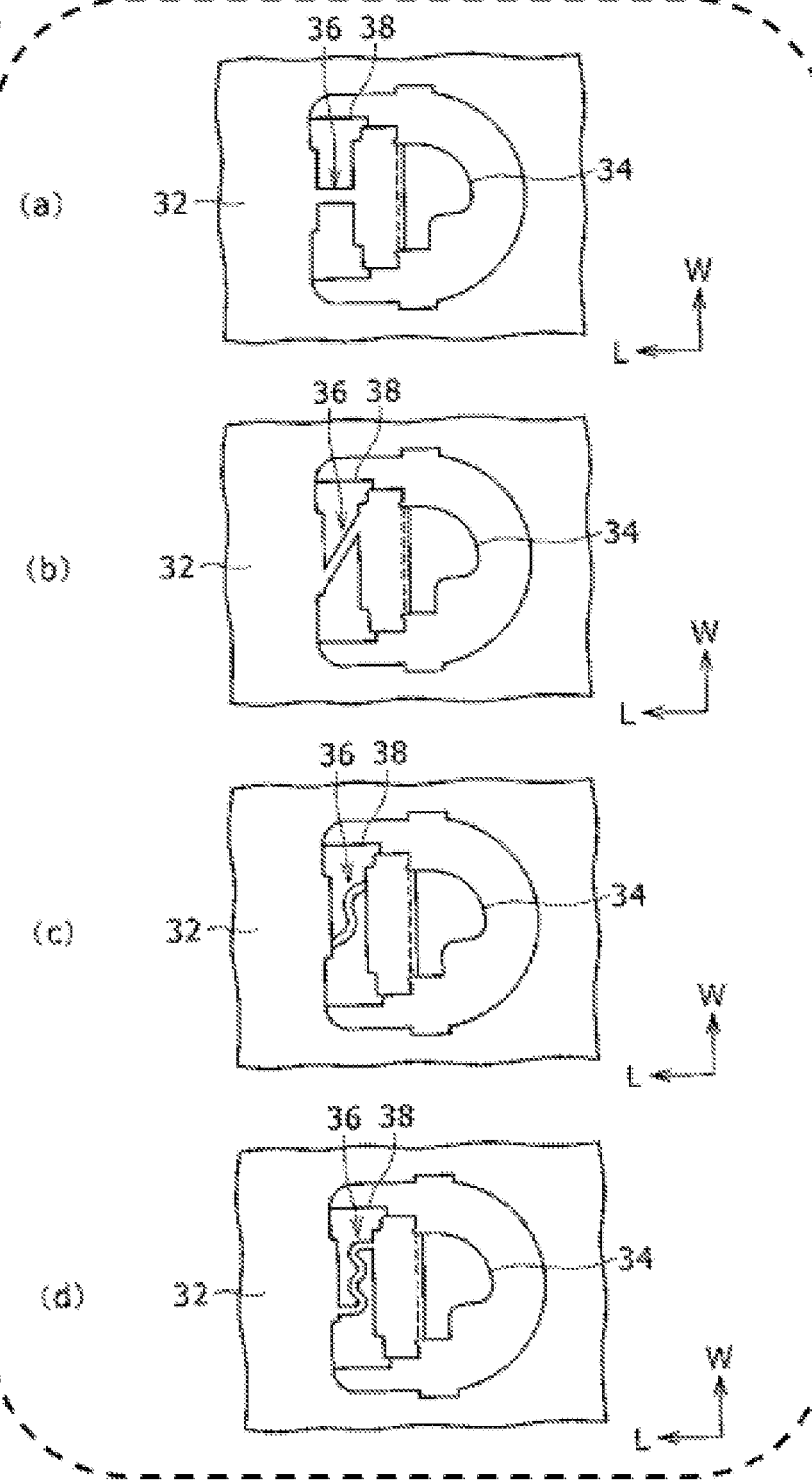
FIG. 6 is a diagram showing modified examples of the shape of a fuse disposed in the negative electrode collector of FIG. 5.

The present exemplary embodiment has described that fuse 36 includes three linear fuse portions 36a, 36b, and 36c and is formed so as to have a substantially S shape or crank shape. However, the present invention is not limited to this. For example, as shown in FIG. 6 (a), fuse 36 may be formed of one linear portion along the direction in which substrate portion 32 faces connection portion 34 (length direction L in the present exemplary embodiment). As shown in FIG. 6 (b), fuse 36 may be formed of one linear portion extending obliquely so as to cross the facing direction. As shown in FIG. 6 (c), fuse 36 may be formed in a curved line so as to have a substantially S shape. Alternatively, as shown in FIG. 6 (d), fuse 36 may be formed in a zigzag shape.

Negative electrode collector 17 including electrode contact portions 30 having the above-mentioned structure is manufactured as follows.

Intermediate components of negative electrode collector 17 are formed by press-punching a base material of a metal thin plate. In each intermediate component, fuse 36 and connection portion 34 that has not yet been bent are formed. At this time, connection portion 34 is connected to temporary link portions 52 (shown by a dashed line). Temporary link portions 52 stabilize connection portion 34, so that a force is prevented from acting on narrow fuse 36 of low strength.

Then, insulating film 38 is bonded, by welding, over a region including fuse 36 across substrate portion 32 and connection portion 34.

Then, the tip of connection portion 34 is bent, and temporary link portions 52 are cut and removed. The bending and cutting may be simultaneously performed using a press die.

Thus, the bonding of insulating film 38 and the bending of connection portion 34 are performed in a state where connection portion 34 is stably held by temporary link portions 52. Therefore, a break or damage of fuse 36 in a manufacturing process of negative electrode collector 17 can be prevented.

Figure 7:
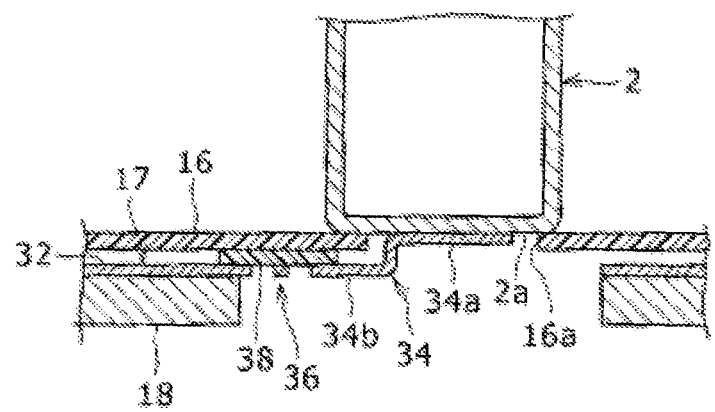
FIG. 7 is a sectional view showing the state where the negative electrode collector of FIG. 5 (a) is connected to the negative terminal of a cell.
Figure 8:
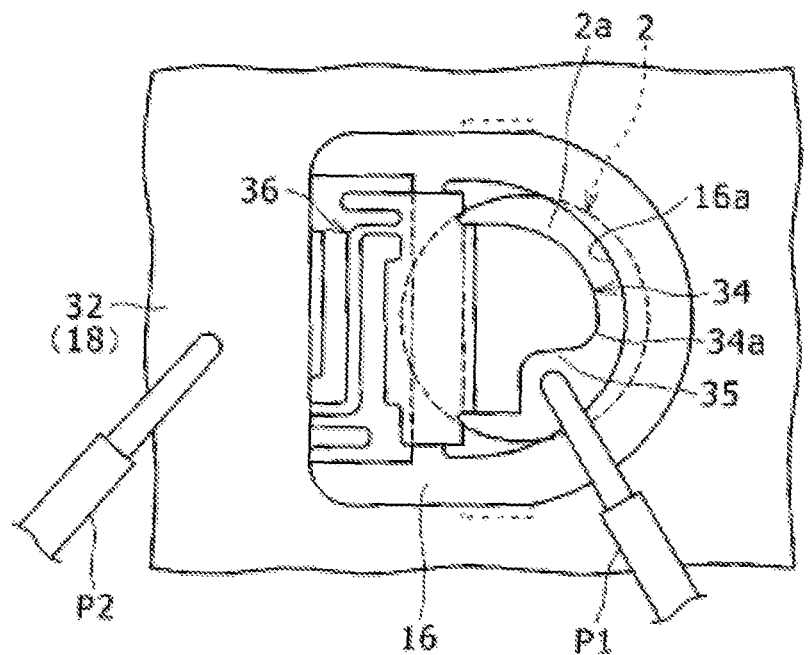
FIG. 8 is a diagram showing a state of measuring the resistance of the fuse of the negative electrode collector assembled into a battery block.

FIG. 7 is a sectional view showing the state where negative electrode collector 17 of FIG. 5 (a) is connected to negative terminal 2a of cell 2. FIG. 8 is a diagram showing a state of measuring the resistance of fuse 36 of negative electrode collector 17 assembled into battery block 1. FIG. 8 corresponds to the bottom view of FIG. 7. In FIG. 7, illustration of case 3 is omitted.

As shown in FIG. 7, when battery block 1 is assembled from negative electrode collector 17, tip 34a of connection portion 34 in electrode contact portion 30 of negative electrode collector 17 is in contact with the surface of negative terminal 2a of cell 2 through opening 16a in negative-side insulating plate 16. In this state, tip 34a of connection portion 34 is welded to the surface of negative terminal 2a.

At this time, as shown in FIG. 8, in negative electrode collector 17 of the present exemplary embodiment, the externally exposed area of the surface of negative terminal 2a of cell 2 is reduced by the edge of opening 16a in negative-side insulating plate 16. However, a large part of the surface is exposed thanks to cut-away portion 35 formed at tip 34a of connection portion 34.

Thus, the tip of one probe P1 of a tester for measuring fuse resistance can be easily and certainly brought into contact with the surface of negative terminal 2a of cell 2. In this state, the other probe P2 is brought into contact with substrate portion 32 (or negative electrode plate 18) of negative electrode collector 17, and the resistance value (or potential difference) between both positions can be measured. Thus, when the measured resistance value (or voltage value) is larger than a predetermined threshold, it can be detected that there is one of a resistance failure of fuse 36 and a welding failure of connection portion 34.

As discussed above, in negative electrode collector 17 and battery block 1 of the present exemplary embodiment, fuse 36 is reinforced by a simple and inexpensive means of bonding insulating film 38. Therefore, a break or damage of fuse 36 can be prevented or suppressed during the connecting work of negative electrode collector 17 to cell 2 and the assembling work of battery block 1. Furthermore, the exposed area of negative terminal 2a of cell 2 is increased by forming cut-away portion 35 at tip 34a of connection portion 34, so that the fuse resistance of negative electrode collector 17 can be easily and certainly measured after battery block 1 is assembled.

The present invention is not limited to the structures of the present exemplary embodiment and a modified example thereof. Items described in the scope of the claims of the present application and various modifications or improvements in a scope equivalent to the former scope are allowed.

For example, negative electrode collector 17 including fuses corresponding to a plurality of cells 2 included in battery block 1 has been described. The present invention is not limited to this. The electrode member of the present invention may be applied to at least one cell.

For example, in the above description, negative electrode collector 17 connected to negative terminals 2a of cells 2 includes electrode members. The present invention is not limited to this. The electrode member of the present invention may be applied to positive electrode collector 11 connected to positive terminals of cells 2.

Furthermore, in the above description, projections 44 and 46 and overhangs 48 and 50 for enlarging the bonding area to insulating film 38 are disposed on substrate portion 32 and connection portion 34. The present invention is not limited to this. At least one of the projection and overhang may be disposed at least one of substrate portion 32 and connection portion 34. Alternatively, these projection and overhang do not need to be disposed.

The invention claimed is:

1. An electrode member connected to a terminal of a cell, the electrode member comprising:
    a substrate portion made of a conductive plate material;
    a connection portion defined by a first slit and connected to the terminal of the cell, the first slit being formed in the conductive plate material; and
    a fuse defined by a second slit and including one ends connected to the substrate portion and the other end connected to the connection portion, the second slit being formed in the conductive plate material so as to extend from the first slit, wherein:
    the connection portion has a tip and a base end, and the connection portion is vertically bent between the tip and the base, and
    the fuse is not vertically bent toward the substrate portion.

2. The electrode member according to claim 1, wherein the connection portion includes a cut-away portion for exposing an electrode surface of the cell.

3. A battery block formed by interconnecting a plurality of cells in parallel, the battery block comprising:
    the plurality of cells;
    a positive-side collection portion for interconnecting a plurality of positive terminals to collect power; and
    a negative-side collection portion for interconnecting a plurality of negative terminals to collect power,
    wherein the positive-side collection portion or the negative-side collection portion includes a collector integrally formed of the plurality of electrode members according to claim 1, and each of the plurality of electrode members corresponds to each of the plurality of cells.

4. The electrode member according to claim 1, further comprising an insulating film bonded to a region across the substrate portion and the connection portion, the region including the fuse and the second slit defining the fuse.

5. The electrode member according to claim 4, wherein an overhang for increasing a bonding area to the insulating film is formed at an edge of at least one of the substrate portion and the connection portion, the at least one facing the second slit.

6. The electrode member according to claim 5, wherein the connection portion includes a cut-away portion for exposing an electrode surface of the cell.

7. The electrode member according to claim 5, wherein the fuse includes:
    a first fuse portion extending from the substrate portion toward the connection portion;

a second fuse portion extending from the connection portion toward the substrate portion; and a third fuse portion disposed between an end of the first fuse portion and an end of the second fuse portion so as to be connected to the ends, and the overhang includes:

a first projection projecting from the substrate portion closely to and substantially in parallel with the first fuse portion; and a second projection projecting from the connection portion closely to and substantially in parallel with the second fuse portion.

8. The electrode member according to claim 7, wherein the connection portion includes a cut-away portion for exposing an electrode surface of the cell.

9. The electrode member according to claim 4, wherein the insulating film includes a thermosetting resin layer, which comes into contact with the fuse.

\* \* \* \* \*